Oct. 16, 1956      B. B. WIMER      2,766,545
CRESCENT SHAPED FISH LURE
Filed Sept. 9, 1953
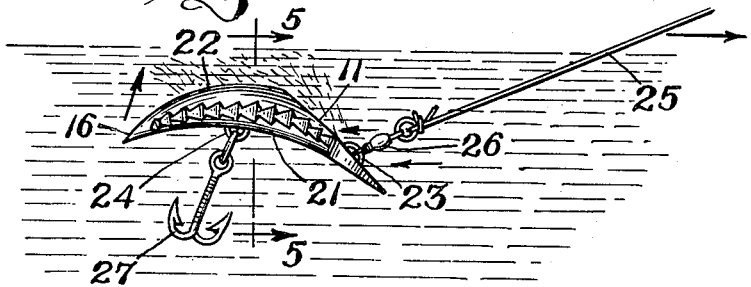
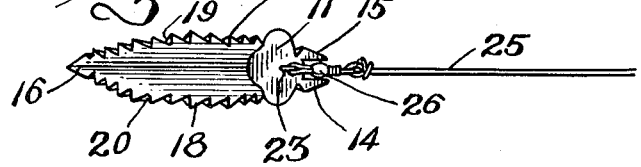
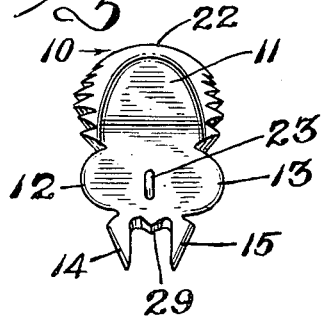 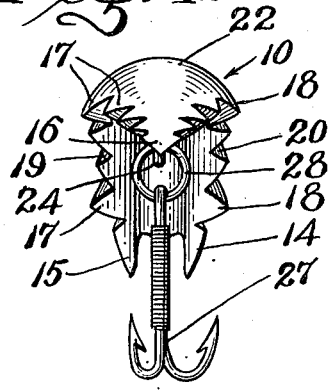
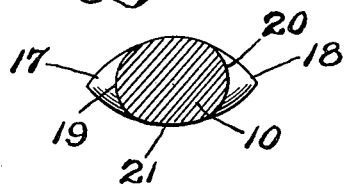
INVENTOR.
Baxter B. Wimer,
BY Victor J. Evans &co.
ATTORNEYS

United States Patent Office 2,766,545
Patented Oct. 16, 1956

2,766,545

CRESCENT SHAPED FISH LURE

Baxter B. Wimer, Worthington, W. Va.

Application September 9, 1953, Serial No. 379,158

1 Claim. (Cl. 43—42.48)

This invention relates to fish lures of the plug type in which hooks are suspended from a body, and in particular a fish lure having an arcuate or crescent shaped body with an elongated fork-shaped nose, with leaf like notches in the edges of the body, which is elliptical-shaped in cross section and with hooks depending from the under concave surface of the body.

The purpose of this invention is to provide a fish lure in which a nose projects downwardly into the water and in which serrations or notches in the edges impart a rippling action to water as the lure is drawn therethrough.

The purpose of this invention is to increase the appeal a fish lure passing through water has to a fish by providing teeth in the edges of the lure which not only give the lure the appearance of a bug but which also cause a rippling motion as the lure travels through water.

Numerous attempts have been made to impart a life-like action to a fish lure and other attempts have been made to disturb water as the fish lure passes therethrough to cause the attention of a fish to be attracted by the lure, however, substantially all lures are provided with smooth edges whereby the lure passes through the water with a smooth easy motion. With this thought in mind this invention contemplates means for forming the edges of a fish lure whereby a rippling action is imparted to water through which the lure passes and whereby the notches or serrations give the lure the appearance of a leaf or bug.

The object of this invention is, therefore, to shape a fish lure whereby an elongated nose on the leading end darts downwardly into the water and whereby projections on the edges disturb water as the lure passes therethrough.

Another object of the invention is to provide an artificial fish lure that is adapted to be used on conventional fishing lines without changing the lines or connection thereto.

A further object of the invention is to provide an improved artificial fish lure in which the lure is of a simple and economical construction.

With these and other objects and advantages in view the invention embodies a lure, crescent-shaped in side elevation, with a body elliptical shape in cross section and having notches in the sides, and having hook and line attaching eyes thereon and a fork on the leading end.

Other features and advantages of the invention will appear from the following description taken in connection with the drawing, wherein:

Figure 1 is a side elevational view showing the improved fish lure with the lure illustrated in an operative position in a body of water.

Figure 2 is a plan view of the lure.

Figure 3 is a front elevational view of the lure with the parts shown on an enlarged scale and with the fishing line and hooks omitted.

Figure 4 is an end elevational view looking toward the trailing end of the lure and also showing the parts on an enlarged scale.

Figure 5 is a cross section through the lure taken on line 5—5 of Fig. 1 showing the body of the lure with other parts omitted.

Referring now to the drawing wherein like reference characters denote corresponding parts the improved fish lure of this invention includes a body 10, oval shape in cross section having a head formed with a flat surface 11, cheek sections 12 and 13 and a fork having prongs 14 and 15 at the forward end, with a point 16 at the tail or trailing end and with teeth 17 and 18 formed by V-shaped notches 19 and 20, respectively, in the edges.

The under surface of the body is concave forming an arcuate section 21 at the center and with an arcuate surface 22 extended from the end of the surface 11 to the point 16, forming the back.

A line attaching eye 23 extends from the head or flat surface 11 and a hook attaching eye 24 extends from the under surface 21. A line 25 is adapted to be attached to the eye 23 through a swivel connector 26 and hooks 27 are adapted to be connected to the eye 24 with a split ring 28.

It will be noted in the front elevational view shown in Fig. 3 that a tongue 29 is provided between the prongs 14 and 15.

With the parts formed and assembled in this manner the lure is attached to a line, such as the line 25 with a swivel 26 and as the lure is drawn through the water the sharp pointed nose darts downwardly with comparatively short jerky movements and the water passing over the teeth 17 and 18 and notches 19 and 20 causes a rippling action, that attracts the attention of fish in the vicinity. The side elevational view, and also the forked nose, particularly with the parts colored, present a pleasing appearance and represent a bug or worm as it is drawn through the water.

The cheek sections 12 and 13, prongs 14 and 15, and tongue 29 serve to insure that the lure will have a more realistic appearance since these portions cause the lure to resemble the head of an insect. Also, the portions 12, 13, 14, 15 and 29 serve to give the lure a lifelike action as it is drawn through the water, and water passing through and around these portions gives the lure a noisy action which attracts fish. Furthermore, the cheek sections and prongs disturb the water to help attract the fish to the lure.

It will be understood that modifications, within the scope of the appended claim, may be made in the design and arrangement of the parts without departing from the spirit of the invention.

What is claimed is:

In a fish lure, a body oval-shaped in cross-section and including a substantially flat upper surface, an eye extending upwardly from said flat upper surface, a swivel connector connected to said eye, a line connected to said swivel connector, said body further including outwardly enlarged arcuate cheek sections, said cheek sections being of the same size, and said cheek sections being arranged in opposed relation with respect to each other, a fork like portion on the front of said body including a pair of spaced apart prongs, said prongs being of the same size and each including inner spaced parallel edges and outer inclined edges, the outer ends of said prongs being pointed, a tongue interposed between said pair of prongs, said tongue being of less size than said prongs, the rear end of said body terminating in a point, there being a plurality of V-shaped notches in each side of said body defining in each longitudinal side edge of the body a plurality of spaced apart pointed teeth, the under surface of said body being concave and defining a central arcuate section, an eye depending from said last named central arcuate section, hooks supported by said eye, the upper rear portion of said body being shaped arcuately, whereby with the lure attached to a line and with the lure being drawn through the water, the pointed prongs and tongue dart downwardly with comparatively short jerky movement so that the water passes over the teeth and notches causing a rippling action which attracts the attention of fish in the vicinity of the lure.

References Cited in the file of this patent

UNITED STATES PATENTS

| | | |
|---|---|---|
| 1,332,306 | Rush | Mar. 2, 1920 |
| 1,359,618 | Oliver et al. | Nov. 23, 1920 |
| 1,791,316 | Jordan | Feb. 3, 1931 |
| 2,133,032 | Martz | Oct. 11, 1938 |
| 2,476,415 | Inchiostro | July 19, 1949 |
| 2,512,914 | Boice | June 27, 1950 |
| 2,590,990 | McCormic | Apr. 1, 1952 |
| 2,641,862 | Poe | June 16, 1953 |